US007195316B2

(12) United States Patent
Shimasaki et al.

(10) Patent No.: US 7,195,316 B2
(45) Date of Patent: Mar. 27, 2007

(54) MULTI-POSITIONAL SEAT

(75) Inventors: Kevin W. Shimasaki, Woodinville, WA (US); Bethany L. Franko, Seattle, WA (US); Bette-Ann Shroyer, Lynnwood, WA (US); Mark E. Wentland, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 354 days.

(21) Appl. No.: 10/665,815

(22) Filed: Sep. 18, 2003

(65) Prior Publication Data

US 2005/0062324 A1    Mar. 24, 2005

(51) Int. Cl.
*A47C 3/00* (2006.01)

(52) U.S. Cl. .................... 297/284.11; 297/321; 297/343

(58) Field of Classification Search ........... 297/284.11, 297/317, 318, 83, 321, 343
See application file for complete search history.

(56) References Cited

U.S. PATENT DOCUMENTS

| 5,215,352 | A | * | 6/1993 | Yeh et al. .................... 297/328 |
| 5,246,266 | A | * | 9/1993 | Ostergaard .................. 297/94 |
| 5,597,203 | A | * | 1/1997 | Hubbard ................... 297/284.3 |
| 5,716,099 | A | * | 2/1998 | McDiarmid ............... 297/302.1 |
| 5,722,726 | A | * | 3/1998 | Matsumiya ................. 297/322 |
| 6,237,994 | B1 | | 5/2001 | Bentley et al. |
| 6,352,309 | B1 | * | 3/2002 | Beroth ................... 297/354.13 |
| 6,494,536 | B2 | * | 12/2002 | Plant ..................... 297/284.11 |
| 6,578,915 | B2 | * | 6/2003 | Jonas et al. ............ 297/284.11 |
| 6,604,791 | B1 | * | 8/2003 | Chen ......................... 297/330 |
| 6,742,840 | B2 | * | 6/2004 | Bentley ..................... 297/316 |

OTHER PUBLICATIONS

Cristian Boriero Sutter & Marcos Acuna InNova, Argentina; "Tall Order"; Aircraft Interiors International, Feb. 2003 issue, CaseStudy, (5 pgs.).

* cited by examiner

*Primary Examiner*—Peter M. Cuomo
*Assistant Examiner*—Sarah B. McPartlin
(74) *Attorney, Agent, or Firm*—Wildman Harrold Allen & Dixon; Timothy K. Klintworth

(57) ABSTRACT

The present invention provides an apparatus for use in sitting on a vehicle and a method for use in manufacturing a seat. The apparatus can include a base, a back secured with the base and a seat pan secured with the base. The seat pan can further include a first portion and a second portion, wherein the first portion is configured to pivot relative to the second portion, such that the first portion of the seat pan pivots allowing a distal end to pivot so that the distal end can be moved out of a relative alignment with the second portion. The seat pan can be movably secured with the base allowing the seat pan to move generally horizontally. The back can also be pivotably secured at with the base allowing a lower portion of the back proximate the seat pan to pivot.

17 Claims, 4 Drawing Sheets

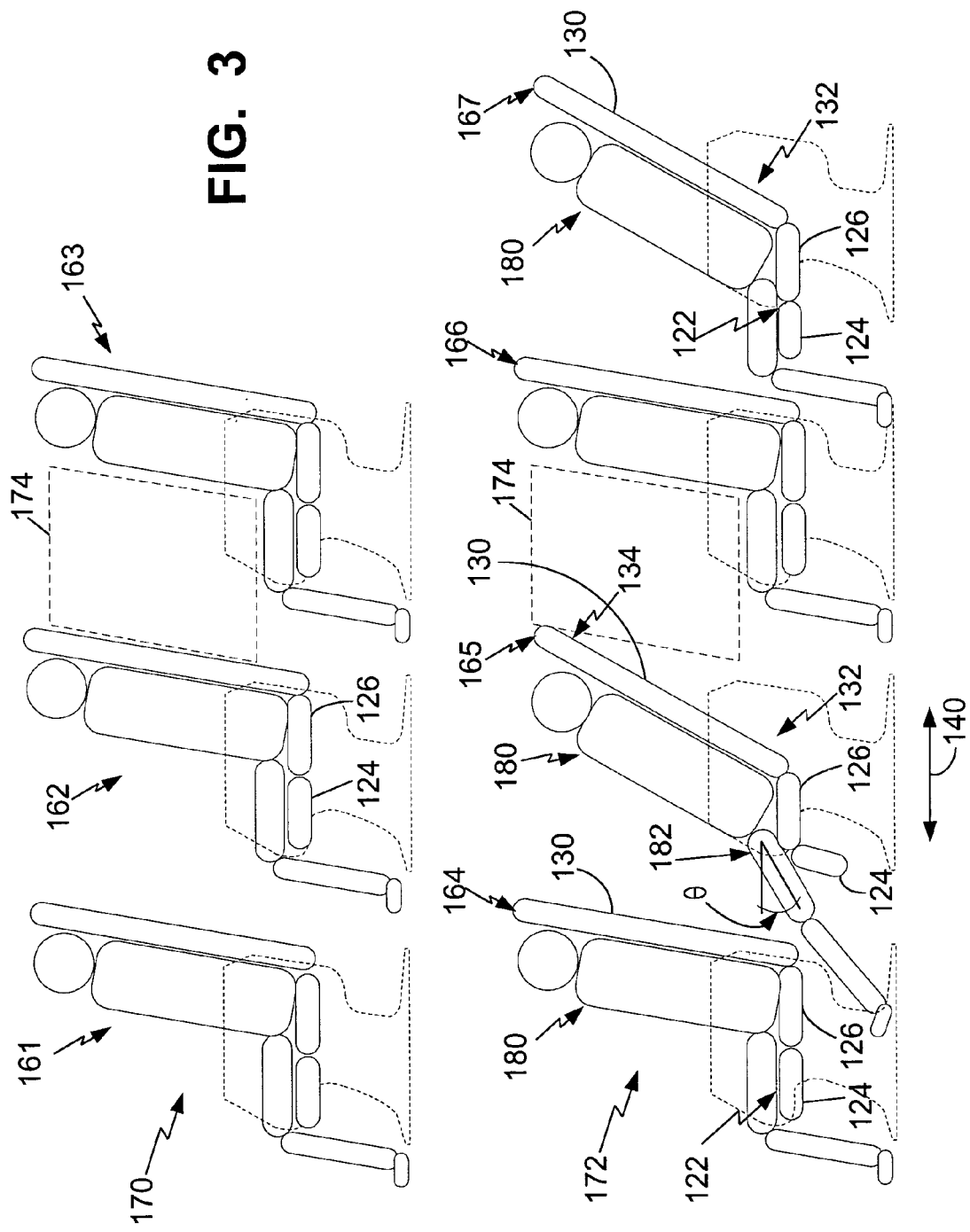

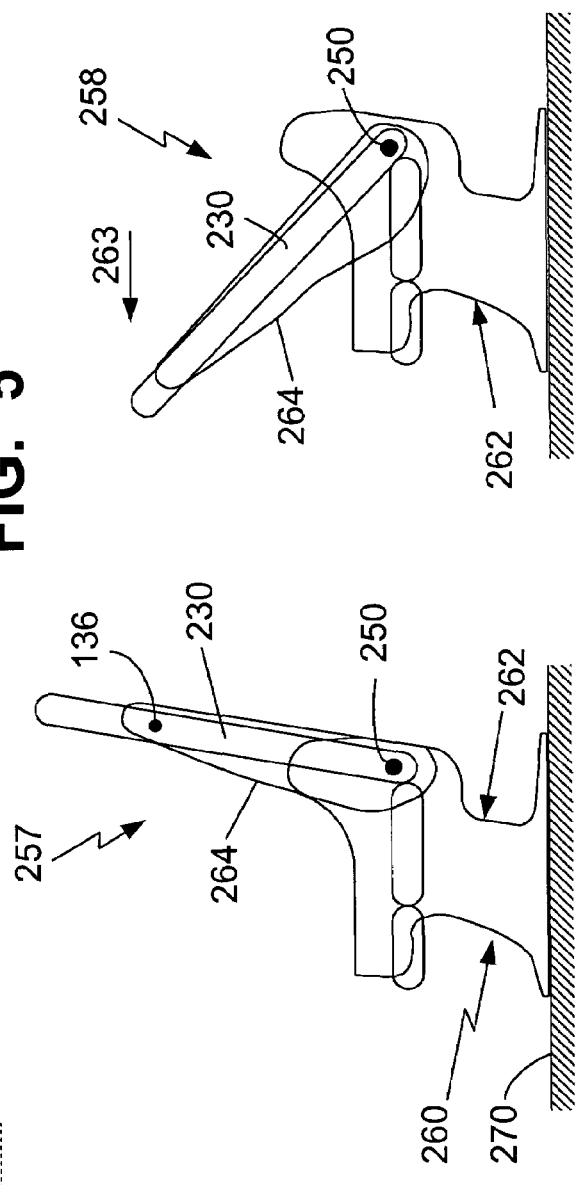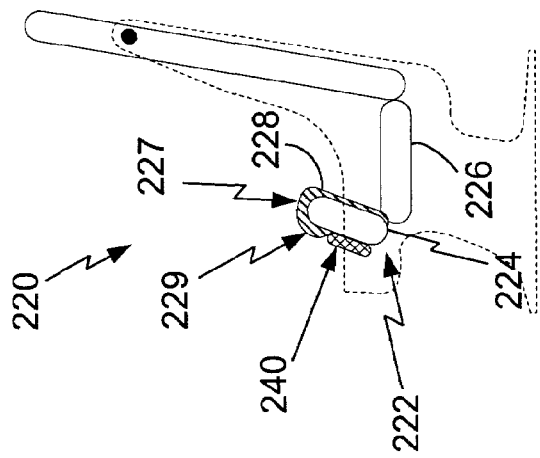

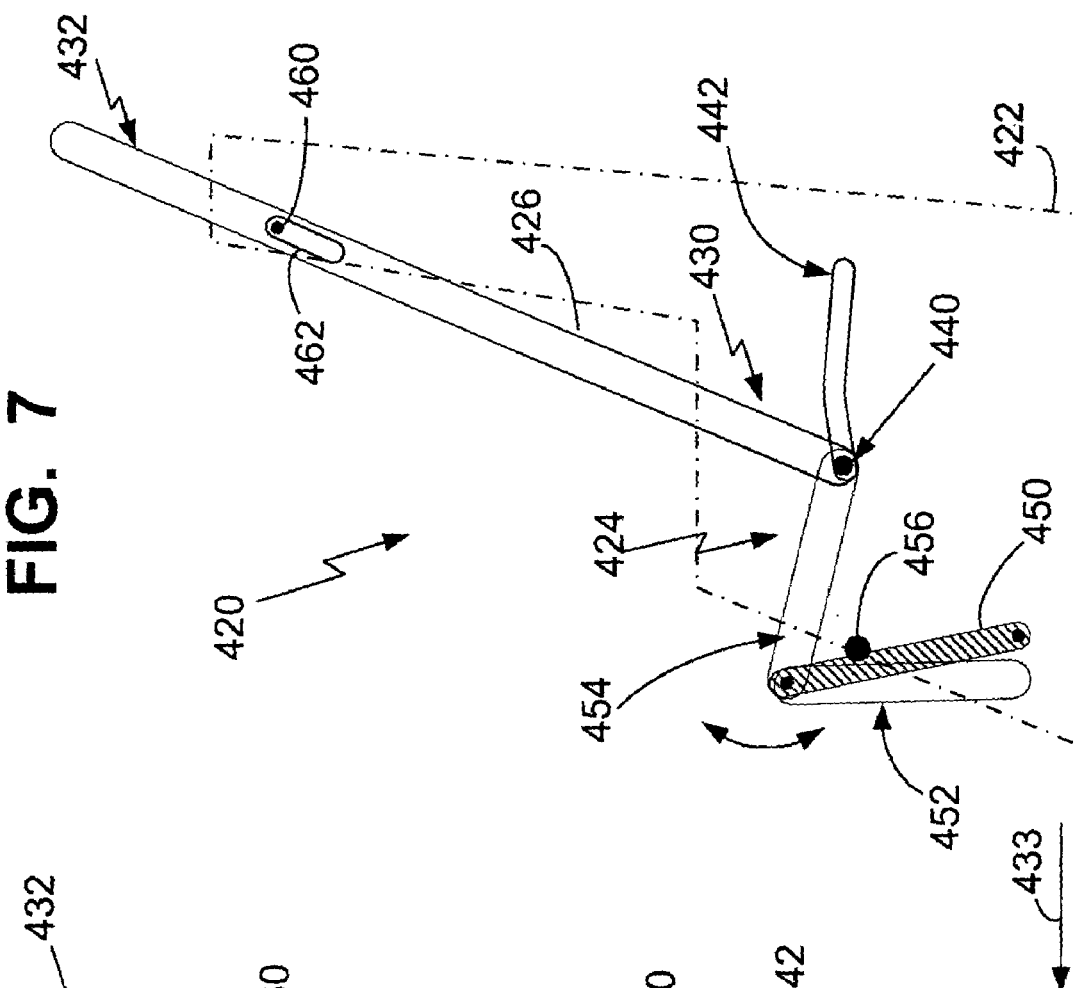
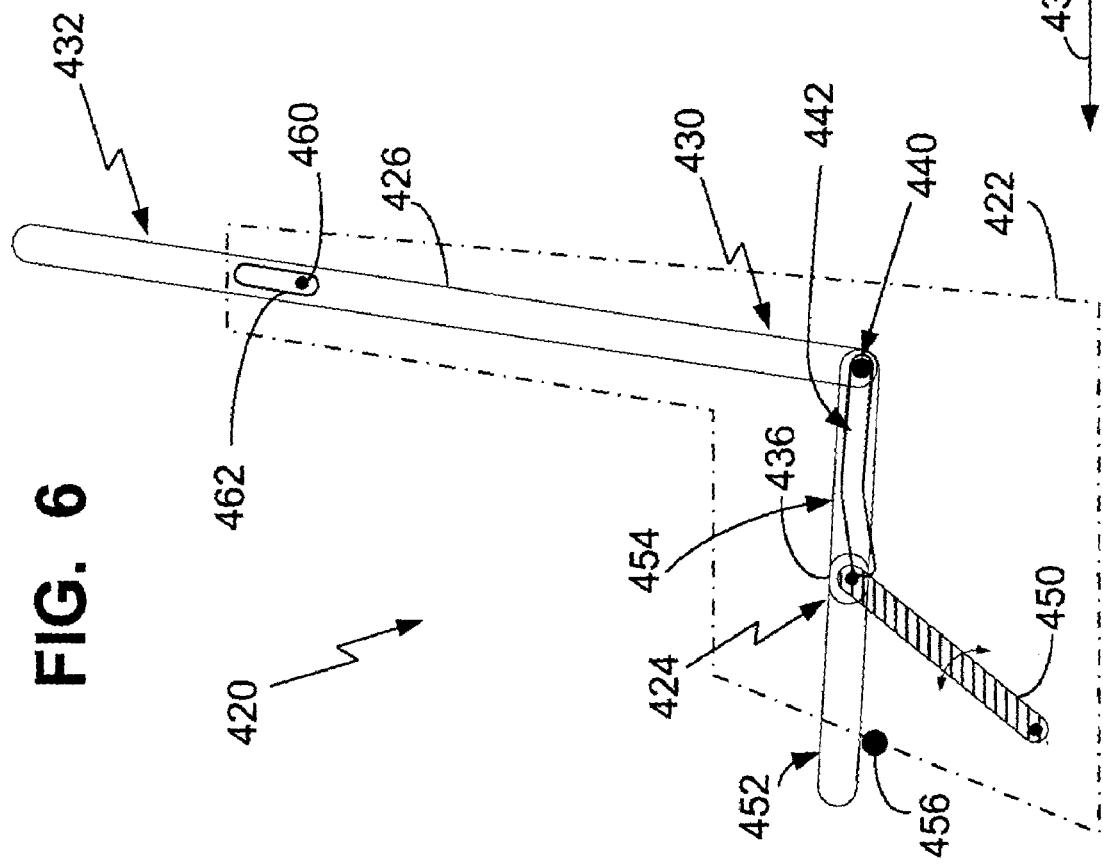

MULTI-POSITIONAL SEAT

The present invention relates generally to seats in vehicles for traveling, and more particularly to reclining seats in vehicles for traveling.

BACKGROUND OF THE INVENTION

Some previous seats utilized in buses, airplanes and other vehicles allow a person using the seat to position themselves in one of two positions, up-right or reclined. These two positions may provide some comfort for a limited period of time. However, over longer periods of time users become uncomfortable in these limited positions.

Further, previous seats in airplanes and buses that allow a user to recline interfere with other passenger's space. The reclining of the seat causes the head back rest to recline back towards and into the space of the person behind the reclined seat. This reduces the space of the person behind. Therefore, the reclining of the seat interferes with the person behind and further limits the amount that the seat can recline.

The present invention advantageously addresses the above and other needs.

SUMMARY OF THE INVENTION

The present invention advantageously addresses the needs above as well as other needs by providing an apparatus for use in sitting in vehicles and a method for use in the production of a seat. In one embodiment, the apparatus includes a base fixed to a vehicle, a seat pan moveably secured with the base and a back rest moveably secured with the base. The seat pan includes a first portion and a second portion, wherein the first portion is rotationally secured relative to the second portion, such that the first portion can be rotationally positioned in a plurality of positions relative to the second portion.

In one embodiment, the present invention provides an apparatus for use in sitting. The apparatus includes a base, a back secured with the base and a seat pan secured with the base. The seat pan includes a first portion and a second portion, wherein the first portion is configured to pivot relative to the second portion, such that the first portion of the seat pan pivots allowing a distal end of the first portion positioned away from the second portion to pivot so that the distal end can be moved out of a relative alignment with the second portion.

In an alternative embodiment, the present invention provides a method for use in manufacturing a seat, including pivotably securing a first portion of a seat pan with a base, movably securing a second portion of the seat pan with the base proximate the first portion, wherein the second portion is movably secured such that the second portion of the seat pan moves along an axis, securing a back frame with the base, and slidably securing a back rest with the back frame such that a lower portion of the back rest pivots as the second portion of the seat pan is moved along the axis.

A better understanding of the features and advantages of the present invention will be obtained by reference to the following detailed description of the invention and accompanying drawings, which set forth illustrative embodiments in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 3 depicts a simplified cross-sectional block diagram of a plurality of aligned seats;

FIG. 4 depicts a simplified cross-sectional, block diagram of the multi-positional seat similar to that shown in FIGS. 1–3 with the seat in alternative positions;

FIG. 5 depicts a simplified cross-sectional, block diagram of two multi-positional seats according to embodiments of the present invention; and FIGS. 6 and 7 depict simplified schematic diagrams of a seat frame according to one embodiment of the present invention that can be utilized in the seats shown in FIGS. 1–5.

Corresponding reference characters indicate corresponding components throughout the several views of the drawings.

DETAILED DESCRIPTION OF THE PREFERRED EMBODIMENTS

Previous seats utilized in airplanes, buses and other vehicles for traveling only provide a person using the seat limited comfort and positioning. Some previous seats are fixed in a single position that limits the user to that single position. Other previous seats allow the user to recline an upper portion of a back rest in an attempt to allow the user to recline. As such, these previous seats allow the user to be in an up-right position or a reclined position. These positions may provide some comfort for short durations of time. However, over longer periods of time, a user becomes uncomfortable in these limited positions.

The present invention provides a multi-positional seat that allows a user to position him or herself in any one of several different positions. This provides the user with the ability to be positioned in any number of comfortable positions.

Another problem with previous reclining seats in airplanes, buses and other vehicles is that the reclining causes the head portion or head rest of the seat to move back towards and into the space of the person behind the reclined seat. This reduces the space of the person behind. Therefore, the reclining of the seat interferes with the person behind and further limits the amount that the seat can recline because the seat cannot extend or encroach too far into the space of the person behind.

Alternatively, the present invention provides for a seat that reclines without encroaching or minimally encroaching into the space of the person behind.

Figure 2:
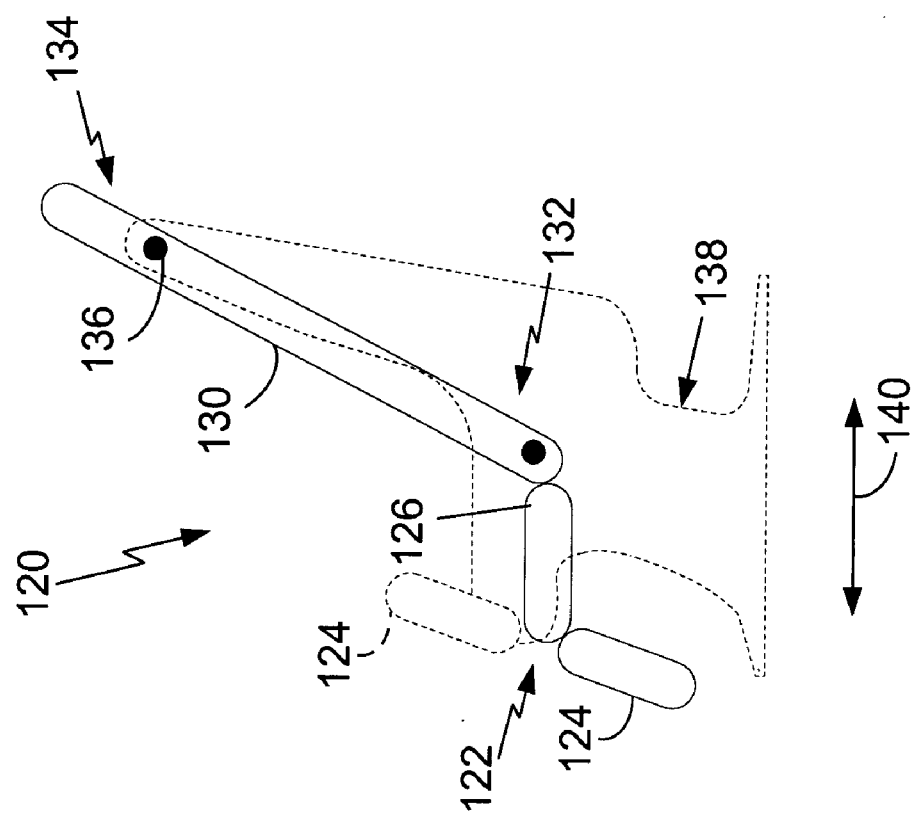
FIGS. 1 and 2 depict simplified, plane cross-sectional views of a multi-positional seat that can be utilized in vehicles according to one embodiment of the present invention.
Figure 1:
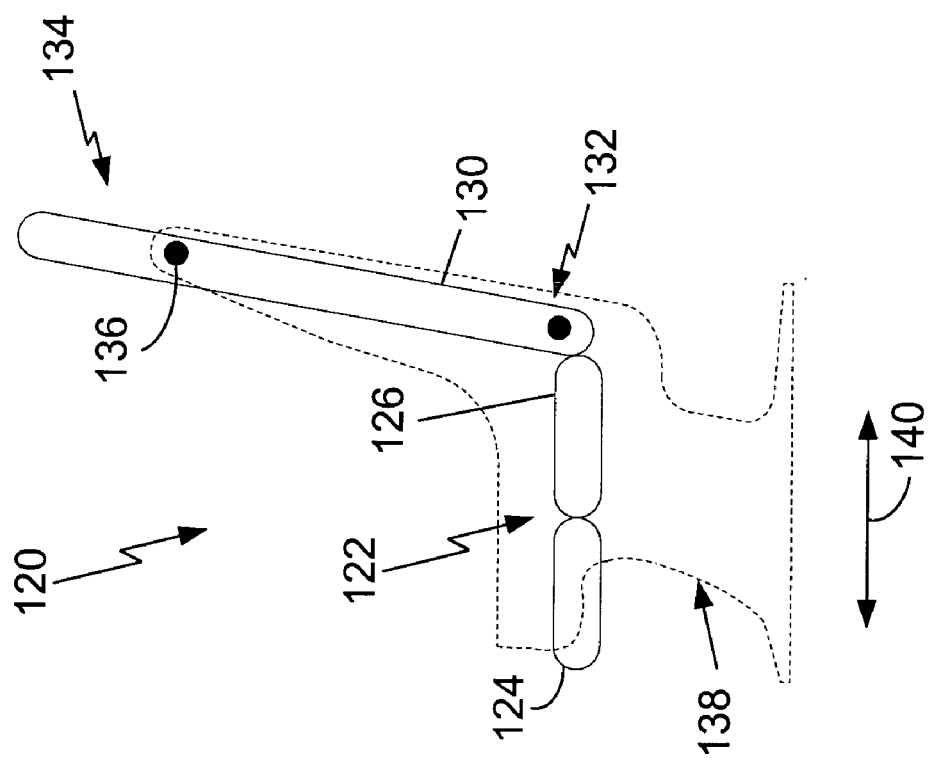

FIGS. 1 and 2 depict simplified plane, cross-sectional views of a multi-positional seat 120 that can be utilized in a plane, bus or other vehicle according to one embodiment of the present invention. The seats 120 are configured to allow the person seated in the seat (user) to shift the position of the seat to any one of a plurality of different positions. For example, the user can shift the seat pan 122 and the lower portion 132 of the back rest 130 generally horizontal (indicated by the arrow labeled 140) reclining the seat (see FIG. 2). Because the seat pan 122 and lower portion 132 of the back rest move forward and back and because the pivot point is at the top of the back rest, the head rest 134 does not move back or minimally moves back into the space of the person behind.

FIG. 2 shows the multi-positional seat 120 of FIG. 1 in a reclined position. The seat pan and back rest are in a forward position. In one embodiment, the seat pan 122 is configured as a split seat pan with a plurality of seat pan portions. For example, the split seat pan 122 can include a front portion 124 and a rear portion 126. The seat pan is configured to allow the front portion 124 to drop down or flip up as the seat pan 122 and lower portion 132 of the back rest are shifted forward. With the front portion 124 of the seat pan dropped, the user can incline his or her legs, particularly the upper legs, at a greater angle than could be achieved with previous seats. With front portion 124 flipped up, a user can sit on the forward edge of the front portion to elevate the user.

Because the person sitting in the seat 120 can stretch his/her legs at a greater angle, the person can more easily extend his/her legs under the seat in front of them. This allows the user to achieve an even greater reclined position without intruding on the person behind.

The back rest 130 is slidably or moveably secured to a frame 138 at a first recline pivot point 136. The back rest 130 pivots about the recline pivot point 136. The pivot point 136 is positioned in an upper portion of the back rest near the head rest 134. This allows the lower portion 132 of the back rest 130 to pivot or swing forward while limiting or preventing the head rest from shifting back.

FIG. 3 depicts a simplified cross-sectional block diagram of a plurality of aligned seats 161–167. A first set 170 shows a series of seats 161–163 in an up-right and non-reclined position. A second set 172 shows a series of seats 164–167 with two of the seats 164 and 166 in an up-right and non-reclined position, and two seats 165 and 167 in a reclined position. As described above the seat pan 122 and lower portion 132 of the back rest 130 of the reclined seat 165 shifts generally horizontally relative to the floor to which the seat is typically secured (indicated by arrow labeled 140). This reclines the back rest 130. However, the head rest 134 does not move back or minimally moves back into the space of the person behind (indicated with a dotted enclosure labeled 174).

The seat pan 122 includes the front portion 124 and the rear portion 126. In an up-right position the front and rear portions are typically in relative alignment allowing someone to sit on the seat pan. The reclined seat 165 is shown with the front portion 124 pivoted or dropped out of alignment with the rear portion 126. This allows the upper portion of the user's legs 182 to be position at an angle θ that is greater than would otherwise be possible. The greater angle provides the user 180 with more options in positioning himself or herself. Further, allowing the user to drop his or her upper legs at a greater angle allows the user to extend their legs toward, and typically under the seat in front (in this example, seat labeled 164) to achieve a more reclined position.

A person using a previous seat could attempt to achieve this angle of extension with their legs only by slouching or scooting forward on the seat pan. However, this is often prevented because the person's knees contact the seat in front before achieving the extended angle θ. Further, the user looses back support when slouched or sitting forward in the seat pan which quickly becomes uncomfortable.

As such, the present invention allows an individual sitting in a seat to recline the seat without reducing the space of the person behind. Further, the present invention allows the person to recline and extend their legs at a greater angle than was available in previous seats. Because the seat pan 122 and lower portion 132 of the back rest 130 move forward and the front portion 124 of the seat pan drops, the person sitting in the reclined seat can achieve a reclined position at least similar to and typically greater than positions achieved in previous seats, without reducing the space 174 of the person behind.

The seat pan 122 can also be moved forward while keeping the front portion 124 in a position aligned with the rear portion 126. The fourth seat 167 shows the seat in a reclined position with the seat pan 122 and lower portion 132 of the back rest 130 moved forward. The front portion 124 is maintained in a position relatively aligned with the rear portion 126. This provides the user 180 with support for the upper part of their legs 182 and provides another position for the user.

FIG. 4 depicts simplified, cross-sectional, block diagrams of the multi-positional seat 220 similar to that shown in FIGS. 1–3 with the seat in alternative positions. The seat pan 222 of the seat 220 includes multiple portions, such as a front portion 224 and a rear portion 226. The front portion 224 can be pivoted or shifted into an inverse or elevated position such that at least some of the front portion at a distal end extends above the rear portion 226. This allows the user to sit on a front or distal edge 227 of the front portion 224 of the seat. Sitting on the front edge allows the user to position him/herself in an elevated or perched position. This position provides the user with another alterative position in which to sit and get comfortable.

Further, this perched position can be advantageous for shorter users or children to see over the seat in front, for example for watching a movie. In some embodiments, the front portion 224 is pivoted around on top of the rear portion 226 allowing the user to sit on an under side of the front portion 224 of the seat pan 220 providing a wider seat area on which to perch.

Still referring to FIG. 4, when the seat 220 is configured to allow the front portion 224 of the seat pan 222 to swing up, a cushioning 228 of the front portion 224 is provided, and is some embodiments wraps at least partially around to the under side 229 of the front portion 224. In this configuration, a life vest 240 or other flotation device can be secured within the portion of the under side 229 without the cushioning 228.

Allowing the front portion 224 to swing up provides additional space between the seat 220 and a seat directly in front. The additional space aids in entering and leaving seats. Further, a person can lift the front portion and stand in front of the folded portion allowing additional space for another passenger to get by when entering or departing a row of seats.

The multi-positional seat 120, 220 is further configured to provide safety during a crash of the vehicle in which the seat is secured. FIG. 5 depicts simplified cross-sectional, block diagrams of two multi-positional seats 257, 258 according to one embodiment of the present invention. In one embodiment, the back rest 230 is further secured with a frame 260 at a forward crash pivot point 250. In addition to the reclining pivot position 136, the seat includes the crash pivot 250 such that the upper or head rest portion of the back rest 230 and frame 260 pivot forward when at least a predefined force is applied to the back rest and/or frame. The frame can include a base portion 262 and a back portion 264. The base portion is secured with a floor 270 of an airplane, bus or other vehicle. The back portion 264 is pivotably secured with the base portion 262. When a force exceeding a predefined threshold is applied to the back 230 or frame 264, the back rest 230 and back portion 264 of the frame pivots. The pivoting reduces potential injury to someone hitting the seat during a crash, and limits damage to the seat and flooring. In some embodiments, the crash pivot 250 can be the same pivot as employed to secure the lower portion of the back rest with the rear portion of the seat pan to allow the lower portion to swing forward.

Still referring to FIG. 5, a first seat 257 of two seats 257 and 258 is depicted in a normal up-right position. The second seat 258 shows the seat after a forward force (indicated by the arrow labeled 263) is applied to the seat 258. When the force 263 exceeds a predefined level, the frame 262 and back 230 pivot at the crash pivot 250. The crash pivot provides added safety for passengers and helps to prevent the frame 136 from being dislodged from the mountings in the floor of the airplane, bus or other vehicle.

The seat according to the present invention additionally makes it easier for passengers to get into and out of seats. Frequently, airplanes, buses and other vehicles secure a plurality of seats in a row. As such, passengers must often pass one or more seats to get to their seat within the row. Because the seat pan of the present invention is configured with a plurality of portions, the front portion can be pivoted out of the way (up or down) to increase passage space easing ingress and egress to and from seats. This also provides for an added safety feature. By easing the egress, passengers can more easily get out of their seat rows and to exit doors in emergency situations.

FIGS. 6 and 7 depict simplified, cross-sectional diagrams of a seat frame 420 according to one embodiment of the present invention. The seat includes a base 422 that is secured to a vehicle, such as the floor of the passenger compartment of an airplane. The seat frame 420 includes a seat pan frame 424 and a back or back rest frame 426. The seat pan and back rest frame are moveably secured with the base 422 to allow the seat pan frame 424 and a lower portion 430 of the back rest frame 426 to move or slide generally horizontally (as indicated by the arrow labeled 433).

In one embodiment, the seat pan frame 424 and back rest frame 426 are secured to the base 422 through a roller, pin or the like 440 mounted within a track 442. The roller rolls along the track as a force is applied to seat pan 424 and/or back rest 426 shifting the position of the seat pan and lower portion 430 of the back rest along the track 442. The track 442 limits the movement of the seat pan and back rest.

The seat additionally includes a pivot arm 450. The pivot arm is pivotably fixed at one end to the base 422. The other end of the pivot arm 450 is secured with the seat pan frame 424. In some embodiments, the pivot arm is rotationally secured with a proximal end of the front portion of the seat pan frame positioned proximate the rear portion of the seat pan frame. The pivot arm aids in maintaining the position of the seat pan and back rest, and avoiding inadvertent shifts between up-right and reclined positions. The pivot arm 450 is configured with sufficient length such that a slight lifting force is employed to effect a shift and thus prevents inadvertent shifts from an up-right position to the recline position and vice versa.

A user applies a forward force as well as a lifting force (for example, by applying a force on the upper portion 432 of the back rest). The up-ward force allows the seat pan to lift at the point 436 where secured with the pivot arm (e.g., at the junction between a front portion 452 and a rear portion 454 of the seat pan frame) allowing the pivot arm to swing forward. As the seat pan moves forward the pivot arm 450 continues to pivot pushing the front portion 452 of the seat pan. The front portion of the seat pan rolls over a peg, roller or other device 456 as it is pushed forward. Once the majority of the length of the front portion of the seat pan extends beyond the roller 456, the front portion begins to swing down out of alignment with the rear portion 454 of the seat pan.

Once the front portion 452 drops down out of alignment, the rear portion 454 continues forward to a maximum forward and reclined position limited by the track 442. The lower portion 430 of the back rest frame 426 also continues forward, reclining the back rest until the roller 440 reaches the end of the track 442. The pivot arm 450 provides similar functionality for returning the seat from a reclined position to the up right position. The user again provides a lifting as well as a rearward force to allow the pivot arm to swing back over vertical as the seat pan roller 440 travels through the track 442.

In one embodiment, the upper portion 432 of the back rest includes an upper back rest slide/pivot point 460. The upper slide/pivot point 460 maintains the position of the back rest while allowing the lower portion 430 to swing out as the seat pan is shifted forward establishing the reclined position. In one embodiment, the upper slide/pivot point 460 is secured within a track 462. The track allows the back rest to swing forward to establish the reclined position while the lower portion of the back rest 430 is moved forward when the seat pan 424 is moved forward.

The seat can be assembled by moveably securing the track 442 with the base 422. The seat pan frame 424 and back rest frame 426 can then be secured with the track 442. The pivot arm 450 can be pivotably secured with the base 422 and the seat pan frame 424. The upper portion 432 of the back rest frame 426 is further secured with the base 422. As described above and in reference to FIG. 5, the base can include the base portion 262 and a back portion 264, where the back portion 264 is pivotably secured with the base portion 262. Further, the front portion of the seat pan frame can be pivotably secured with the pivot arm or the rear portion of the seat pan frame.

In an alternative embodiment, the seat pan 122 and lower portion 132 of the back rest are hydraulically controlled. A piston, pulley system or other similar mechanism is fixed to the seat pan 122 and frame 136. The user depresses a button or other activation device to release the piston. With the button depressed the user can apply a forward force to the seat pan and/or a backwards force to the upper portion of the back rest to slide the seat pan forward to a desired position. Once in the desired position, the user releases the button to secure the piston and thus the seat pan. The user can shift to other positions or return to the up-right position by depressing the button and applying backward pressure to the seat pan and/or lower portion of the back rest.

With previous seats if a person is sitting in front of a wall, bulk-head or other structure the seat cannot recline because there is no space for the seat back rest to move.

Alternatively, the present invention allows a person sitting in front of a wall, bulk-head or other structure to recline his/her seat because the seat pan and lower part of the back rest moves forward away from the wall. As such, the person can still recline.

In one embodiment, the seat 120 is further configured to allow the back rest to additionally recline into the space of the person behind to an extent similar to that seen in previous seats. In this embodiment, not only does the seat pan and lower portion of the back rest shift forward and the front portion of the seat pan drops down, the back rest can tilt back. This allows the person sitting in the seat to achieve an even greater reclined position providing more comfort and more possible positions.

One or more cushions of the back rest can be configured as a flotation device. As such, the user can remove the portion of the back rest in emergency situations.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for use in sitting in a vehicle for travel, comprising:
    a base;
    a seat pan moveably secured with the base;
    a back rest moveably secured with the base; and
    a pivot arm secured with the base proximate a first end of the pivot arm and secured with the seat pan proximate a second end of the pivot arm;
    the seat pan includes a first portion and a second portion, wherein the first portion is rotationally secured relative to the second portion, such that the first portion can be rotationally positioned in a plurality of positions relative to the second portion and wherein the first portion is rotationally secured such that in a first position the first portion of the seat pan is in alignment with the second portion and in a second position the first portion is out of alignment with the second portion such that a distal end of the first portion furthest from the second portion is below a proximal end of the first portion proximate the second portion;
    wherein movement of the second portion of the seat pan causes a change in an angle between the backrest and the second portion, and the pivot arm pivots about the first end moving the first portion of the seat pan as the seat pan is moved.

2. The apparatus as claimed in claim 1, wherein the seat pan is moveably secured with the base such that the seat pan moves generally horizontal relative to the base.

3. The apparatus as claimed in claim 2, wherein the back rest is moveably secured with the base such that a lower portion of the hack rest pivots as the seat pan is moved.

4. The apparatus as claimed in claim 1, wherein the first portion is rotationally secured such that in a third position the first portion is out of alignment with the second portion such that the distal end is above the proximal end proximate the second portion.

5. The apparatus as claimed in claim 1, further comprising a first track fixed with the base, wherein the seat pan is mounted with the first track such that the seat loan is movably secured with the base allowing the seat pan to side along the first track.

6. An apparatus for sitting in a vehicle, comprising:
    a base;
    a back secured with the base;
    a seat pan secured with the base; and
    the seat pan includes a first portion and a second portion, wherein the first portion is configured to pivot relative to the second portion, such that the first portion of the seat pan pivots allowing a distal end of the first portion positioned away from the second portion to pivot so that the distal end can be moved out of a relative alignment with the second portion and wherein movement of the second portion of the seat pan causes a change in an angle defined between the backrest and the second portion;
    wherein the back is pivotably secured at a first pivot point with the base wherein a lower portion of the back proximate the seat pan pivots in a first direction toward the seat pan and an upper portion of the back distal from the seat an does not move in a second direction generally opposite the first direction beyond a plane defined by the back in a non-reclined position.

7. The seat as claimed in claim 6, wherein the seat pan is movably secured with the base wherein the seat pan moves generally horizontal relative to the base.

8. The seat as claimed in claim 7, wherein the distal end of the first portion of the seat pan pivots out of alignment with the second portion and towards a floor upon which the base is supported when the seat pan is moved generally horizontally in said first direction.

9. The seat as claimed in claim 6, wherein the back includes a back frame pivotably secured at a second pivot point with the base such that the back pivots at the second pivot point causing said upper portion of the back to move in said first direction when a force exceeding a predefined level is applied to the back in the first direction.

10. The seat as claimed in claim 6, wherein the first portion of the scat pan pivots such that the distal end extends above the second portion of the seat pan.

11. The seat as claimed in claim 10, wherein the first portion of the seat pan pivots such that the first portion is positioned above the second portion of the seat pan.

12. The seat as claimed in claim 6, wherein the back comprises a back frame secured with the base and a back rest pivotably secured with the back frame such that a first portion of the back rest proximate the seat pan pivots relative to the back frame.

13. The seat as claimed in claim 6, wherein the seat pan is configured such that the first portion is configured to pivot about perpendicular relative to the second portion.

14. The seat as claimed in claim 6, wherein the first portion pivots in response to movement of the second portion.

15. A method for use in manufacturing a seat for use in a vehicle, comprising:
    pivotably securing a first portion of a seat pan with a base;
    movably securing a second prof on of the seat pan with tile base proximate the first portion, wherein the second portion is movably secured such that the second portion of the seat pan moves along an axis;
    securing a back frame with the base, including rotationally securing the back frame with the base such that the back frame at least partially rotates relative with the base when a force of at least a predefined level is applied in a first direction; and
    pivotably securing a back rest with the back frame such that a lower portion of the back rest pivots as the second portion of the seat pan is moved along tile axis.

16. The method as claimed in claim 15, wherein the step of pivotably securing the first portion of the seat pan with the base includes securing the first portion such that the first portion pivots out of alignment with the second portion of the seat pan.

17. An apparatus for sitting in a vehicle, comprising:
    a base;
    a back secured with the base;
    a seat pan secured with the base; and
    the seat pan includes a first portion and a second portion, wherein the first portion is configured to pivot relative to the second portion, such that the first portion of the seat pan pivots allowing a distal end of the first portion positioned away from the second portion to pivot so that the distal end can be moved out of a relative alignment with the second portion, and wherein movement of the second portion of the seat pan causes a change in an angle defined between the backrest and the second portion, wherein the seat pan is movably secured with the base, wherein the seat pan moves generally horizontal relative to she base, wherein the distal end of the first portion of the seat pan pivots out of alignment with the second portion and towards a floor upon which the base is supported when the seat pan is moved generally horizontally in a first direction.

* * * * *